UNITED STATES PATENT OFFICE.

ERNST H. ZOLLINGER AND HERMAN ROEHLING, OF BERLIN, GERMANY.

PROCESS FOR THE PREPARATION OF AROMATIC PHENOLS AND THEIR SUBSTITUTION PRODUCTS.

1,321,271.            Specification of Letters Patent.      Patented Nov. 11, 1919.

No Drawing.     Application filed November 16, 1915. Serial No. 61,823.

*To all whom it may concern:*

Be it known that we, ERNST H. ZOLLINGER, chemist, a citizen of Switzerland, and HERMAN ROEHLING, chemist, a citizen of the United States of America, residing at Berlin, Kingdom of Prussia, German Empire, have invented a new and useful Improvement in Processes for the Preparation of Aromatic Phenols and Their Substitution Products; and we do hereby declare the following to be a full, clear, and exact description of the same.

The present invention relates to a process for the preparation of aromatic phenols and their substitution products and is based upon the ability of the halogen in aromatic compounds to be exchanged for the hydroxyl radical. The usual methods of preparing the aromatic phenols consist in fusing the aromatic halogen compounds with caustic alkalis or heating the halogen compounds with solutions of the hydrates of alkalis, alkaline earths or metals. The yield of these older methods is not satisfactory owing to the formation of resinous substances; besides the processes are rather slow and the separation of the final products difficult.

The present process consists in allowing a certain amount of the compounds of lead which form insoluble or difficultly soluble compounds with the phenols to act on the halogen compounds along with the hydrates of alkalis or alkaline earths. Owing to the formation of these metallic compounds in the course of the process, the phenolates formed are prevented from taking part in the reaction and thereby protected from any further change. Apart from that, the substitution of the halogen by the hydroxyl group is facilitated on account of the disturbance of the equilibrium due to the separation of the insoluble compounds. As mentioned above, the invention makes use of such compounds of lead which form difficultly soluble or insoluble compounds with the phenols and from which the phenols can be regenerated. Metals which interact with the phenols in such a manner that a recovery of the phenols is impossible, are not applicable. In the German Patent No. 82078 to Baum a method is proposed in which monohalogenoxybenzaldehydes are heated (or treated) with lead hydrate. In that process the lead hydrate alone is applied as a saponifying agent, whereas in the present process the other metal hydrates combined with the hydrates of alkali metals or alkaline earths are used to bring about the reaction. It is therefore clear that contrary to Baum the metal hydrates do not play the part of the saponifying agent in the present process. We can add the lead compound ready formed, but we can also produce it from metallic salts in the course of the process. We can also add it in the form of solutions, in alkalis for instance. The addition may be made at once or in portions. The metallic compound formed by the recovery of the phenolic compound can be directly used again in the process. The metallic compound can be added in an equivalent quantity, but we can also add less or even an excess to diminish the concentration of the alkali present.

The process is specially suitable for the preparation of dioxybenzenes and their substitution products for instance, pyrocatechin, homo-pyrocatechin, or isoorcin may be made in that manner. We can also make phenol derivatives which contain besides the hydroxyl group still other groups, for instance the sulfo-carboxyl, aldehyde-group and so forth. We can for instance prepare by our process phenol, phenol sulfonic acid, salicylic acid, p- and m-oxybenzoic acid.

As raw-material we use the saponifiable halogen compounds, for instance the chlorin or bromin derivatives.

We may also employ certain agents, catalysts to accelerate the reaction, for instance copper or copper compounds, the iodids of alkalis and alkaline earths, salts of iodic acid, vanadium, titanium, molybdenum, the rare earths and their salts.

The reaction proceeds very quickly. Whereas the reaction of the halogen compounds with alkaline earths (see German Patent 249939) takes from 6 to 24 hours and even takes at least 5 hours in the presence of copper and copper salts (see German Patent 269544) the present process can be carried out in much less time. That is due to the fact that the mass can be heated to a high temperature without decomposition. It is preferable to heat the mass very quickly to the temperature of saponification whereby the reaction takes place almost instantaneously. The yield is nearly theoretical and the separation of the products formed is very simple. The extraction from dilute solutions required in the processes hitherto in use is dispensed with.

*Example 1.*

20 gr. of o-chlorophenol are quickly heated with a solution of 52 gr. of lead acetate in 150 cc. of 25% caustic soda solution and some copper salt in an autoclave to 250° C. The heating requires no special apparatus and the temperature is reached in about 45 minutes. The autoclave after cooling down is opened and the pyrocatechin-lead salt which crystallizes out in small scales is decomposed with sulfuric or hydrochloric acid. The yield of pure pyrocatechin amounts to 14.5 gr.

*Example 2.*

20 gr. of o-chlorophenol are heated with lead hydrate or an equivalent quantity of lead sulphate suspended in 100 cc. of a 20% caustic soda solution. A few crystals of a copper salt or an iodid are added and the mass is quickly heated to 260° C. After attaining that temperature the autoclave is quickly cooled down and the contents which are well crystallized are worked up, in the manner mentioned under example 1.

*Example 3.*

20 gr. of m-chloro-p-oxybenzaldehyde are stirred up with 32 gr. of lead hydrate in 100 cc. of a 20% caustic soda solution. After adding a small amount of a copper salt the mixture is heated in an autoclave for a short time above 250° C. The lead compound obtained which is well crystallized is decomposed with sulfuric acid and warmed. On cooling the product desired crystallizes out.

From chlorobenzene we can obtain phenol, from o-dichlorobenzenepyrocatechin, from bromo- or chlorotoluenesulfonic acid the corresponding phenol- or cresol sulfonic acid, from bromocresol or di-bromotoluene, orcin, from sodium p-chlorobenzenesulfonate or p-bromo- benzenesulfonate p-phenol sulfonic acid, from sodium 1.2 dichlorobenzene-4-sulfonate the pyrocatechin-4-sulfonic acid, from sodium p-dichlorobenzenesulfonate the hydroquinone sulfonic acid, from 3.5 dihalogenbenzoic acid the 3.5 dioxybenzenecarboxylic acid, from p-chlorobenzaldehyde p-oxybenzaldehyde, from o-chlorobenzaldehyde, salicylic aldehyde, from alphachloronaphthalene, alphanaphthol, from betachloronaphthalene, betanaphthol, from 1.2 chloroanthraquinone alizarin, from halogen-carbazol compounds the corresponding oxy-compounds and so forth.

What we claim, is:—

1. The process of forming a phenolic body, which comprises heating under pressure an aromatic halogen compound in which halogen may be substituted by the hydroxyl group, with a solution of an alkaline hydrate and a lead salt which forms a substantially insoluble compound with the phenol, to the saponification temperature, then quickly cooling to crystallize the heavy metal phenol compound and decomposing the last named compound to free the phenol.

2. The process of forming a phenolic body, which comprises heating an aromatic halogen compound in which halogen may be substituted by the hydroxyl group, with a solution of an alkaline hydrate and a lead salt which forms a substantially insoluble compound with the phenol, then quickly cooling to crystallize the lead phenol compound.

3. The process of forming a phenolic body which comprises heating an aromatic halogen compound in which halogen may be substituted by the hydroxyl group with an alkaline hydrate and a lead salt, which forms a substantially insoluble phenol compound, to a temperature at which a lead phenol compound is formed.

4. The process of forming a phenolic body which comprises heating an aromatic halogen compound in which halogen may be substituted by the hydroxyl group with an alkaline hydrate, a lead salt which forms a substantially insoluble phenol compound, and a catalyst, to a temperature at which a lead phenol compound is formed.

5. The process of forming a phenol body, which comprises heating an aromatic halogen compound, in which halogen may be substituted by the hydroxyl group, with a lead salt capable of forming a substantially insoluble phenol compound, and an alkaline hydrate, to the temperature at which a lead phenol compound is formed.

6. The process of forming a phenol body, which comprises heating an aromatic halogen compound in which halogen can be replaced by hydroxyl, with an alkaline caustic and a lead compound capable of forming a substantially insoluble phenol compound, to a temperature at which a heavy metal phenol compound is formed.

In testimony whereof, we have signed our names to this specification in the presence of two subscribing witnesses.

ERNST H. ZOLLINGER.
HERMAN ROEHLING.

Witnesses:
HENRY HASPER,
ARTHUR SCHROEDER.